United States Patent [19]
Fisher et al.

[11] Patent Number: 5,895,439
[45] Date of Patent: Apr. 20, 1999

[54] METHOD FOR GENERATING AND DISPLAYING COMPLEX DATA DERIVED FROM NON-DESTRUCTIVE EVALUATION SCANNING

[75] Inventors: Jay L. Fisher; Keith S. Pickens, both of San Antonio, Tex.

[73] Assignee: Southwest Research Institute, San Antonio, Tex.

[21] Appl. No.: 08/704,301

[22] Filed: Oct. 15, 1996

[51] Int. Cl.$^6$ .................................................. G06F 91/00
[52] U.S. Cl. ........................................... 702/36; 702/38
[58] Field of Search ......................... 364/554; 365/552; 324/237; 367/7; 73/644

[56] References Cited

U.S. PATENT DOCUMENTS

| | | | |
|---|---|---|---|
| 3,895,290 | 7/1975 | Audenard et al. | 324/37 |
| 4,261,040 | 4/1981 | Wedman et al. | 364/554 |
| 4,631,533 | 12/1986 | Mark, Jr. | 340/721 |
| 4,694,434 | 9/1987 | Von Ramm et al. | 367/7 |
| 4,755,753 | 7/1988 | Chern | 324/237 |
| 4,821,204 | 4/1989 | Huschelrath | 364/481 |
| 4,855,677 | 8/1989 | Clark, Jr. et al. | 324/238 |
| 4,882,679 | 11/1989 | Tuy et al. | 364/413.22 |
| 4,896,278 | 1/1990 | Grove | 364/552 |
| 4,898,034 | 2/1990 | Kupperman et al. | 73/644 |
| 5,028,100 | 7/1991 | Valleau et al. | 324/232 |
| 5,067,157 | 11/1991 | Berger | 382/46 |

*Primary Examiner*—Emanuel Todd Voeltz
*Assistant Examiner*—Matthew Smithers
*Attorney, Agent, or Firm*—Kammer & Huff, PLLC

[57] ABSTRACT

A method utilizing high-speed digital computers and high resolution display systems for stacking a plurality of two-dimensional complex displays acquired from individual NDE scans over the surface of a material being inspected. The solid three-dimensional image constructed incorporates the two dimensions typically provided by eddy current-type testing components, i.e., the imaginary or vertical component and the real or horizontal component, and a third dimension that represents the physical orthogonal distance between sequential scans. The solid three-dimensional image is generated by connecting corresponding positional points on adjacent two-dimensional plane displays. The closed solid figure generated results when a null or equilibrium point away from the specific signal features is encountered. Appropriate coloration or shading on the three-dimensional image highlights the features for visual inspection. The method thus provides a representation of all of the data generated by eddy current-type or other NDE probes in a form that allows visualization of the relevant characteristics of the anomaly that permit its identification and relative importance.

6 Claims, 4 Drawing Sheets

METHOD FOR GENERATING AND DISPLAYING COMPLEX DATA DERIVED FROM NON-DESTRUCTIVE EVALUATION SCANNING

BACKGROUND OF THE INVENTION

1. Field of the Invention

The present invention relates generally to methods for generating and displaying complex (two coordinate) test data taken in two dimensions, using a three-dimensional representation. The present invention relates more specifically to a method for the generation and display of three-dimensional complex data (i.e. inphase and quadrature data obtained using synchronous detection techniques) of the type typically acquired using modern eddy current measuring techniques.

2. Description of the Related Art

Non-Destructive Evaluation (NDE) technologies such as ultrasonics, acoustic emission, electromagnetics, eddy current, radiography, and others, all generally rely on some form of visual presentation of the inspection information to allow for human interpretation of the data. Typically, an NDE test operator must rapidly view and translate graphic or numerical information presented to him in order to quickly acquire an understanding of the physical characteristics of the material under test and to identify critical areas where stresses, defects, flaws, cracks or other anomalies exist. In order make the evaluation of a material practical, the scan of the material, and thus the test operator's analysis, must operate under limited time constraints.

Very often, the type of data collected by the various NDE probes associated with the methods described above, does not translate easily into visual images that permit an immediate interpretation of the collected signal and the detected anomaly in the material. This is particularly true in applications involving eddy current inspection analysis. A major reason for this limitation is that two values are required to characterize the eddy current signal at each test frequency at each test position. A variety of methods and devices for eddy current detection of anomalies in manufactured parts are well known and described in various prior patents.

It is well known to use two-dimensional or x-y scanning systems in the analysis of both planar materials and more complexly-shaped manufactured parts. It is also well known to use computer controls to carry out the scan and to acquire the data that is later utilized for analysis. It is also known in the art to create three-dimensional images and to manipulate those images when materials or manufactured parts are being analyzed. U.S. Pat. No. 5,067,167, issued to Berger on Nov. 19, 1991, entitled "Apparatus and Method for Rotating of Three-Dimensional Images," provides an example of a system for coordinating and manipulating a three-dimensional spatial set of values in conjunction with a gray scale value for tomographic representations such as those acquired in medical imaging. Significant developments have been made in the medical field but have generally been limited to the manipulation of three-dimensional cartesian coordinate data.

U.S. Pat. No. 4,882,679, issued to Tuy et al. on Nov. 21, 1989, entitled "System to Reformat Images for Three-Dimensional Display", describes yet another device intended to create and manipulate three-dimensional images for the medical imaging field. Although the Tuy patent does address three-dimensional imaging and methods for manipulating the resultant images, the data and the display methods are limited to orthogonal sets of spatial coordinates with only one eddy current signal dimension or component.

Some efforts have been made in the past to take the type of data associated with NDE analysis, and in particular eddy current testing, to create an improved means for recognizing flaws, defects and anomalies based upon the data gathered. U.S. Pat. No. 4,755,753, issued to Chern, on Jul. 5, 1988, entitled "Eddy Current Surface Mapping System for Flaw Detection", creates a three-dimensional image from standard eddy current impedance measuring devices. Chern incorporates two spatial dimension directions that represent the physical positioning of the scan and a third dimension that contains the actual eddy current data. Chern utilizes a signal mixer that combines the typical two-outputs of the eddy current instrument with the Y-position drive axis for an x-y plotter. This limits greatly the amount of information that can be conveyed in the three-dimensional image about the particular anomaly under study, because it only uses one component of the eddy current signal at each spatial location.

U.S. Pat. No. 5,028,100, issued to Valleau at al. on Jul. 2, 1991, entitled "Methods for Non-destructive Eddy Current Testing of Structural Members with Automatic Characterization of Faults" also combines the eddy current data into a single dimension in a three-dimensional display. In this case, this single eddy current data dimension is represented as color. The device incorporates an automatic recognition system to identify fault response signatures with previously established signature patterns.

U.S. Pat. No. 4,855,677, issued to Clark, Jr. et al. on Aug. 8, 1989, entitled "Multiple Coil Eddy Current Probe and Method of Flaw Detection", is directed to tubing inspection and in particular to the detection of different types of flaws at different depths within the walls of tubing. This system utilizes a number of different diameter coils operable at different frequencies, creating different levels of magnetic field penetration. The Clark system utilizes a display method not unlike that of Chern referenced above, wherein two dimensions of the display represent physical position, while a single third dimension represents the impedance changes.

U.S. Pat. No. 3,895,290, issued to Audenard et al. on Jul. 15, 1975, entitled "Defect Detection System Using an AND Gate to Distinguish Specific Flaw Parameters", is directed to an automatic method of detecting peak amplitude and phase values in NDE testing of materials, especially eddy current testing. Audenard describes the display of discontinuities in accordance with well-known methods on the complex impedance plane. This patent describes in detail one standard method for two-dimensionally representing data from eddy current testing.

Figure 1:
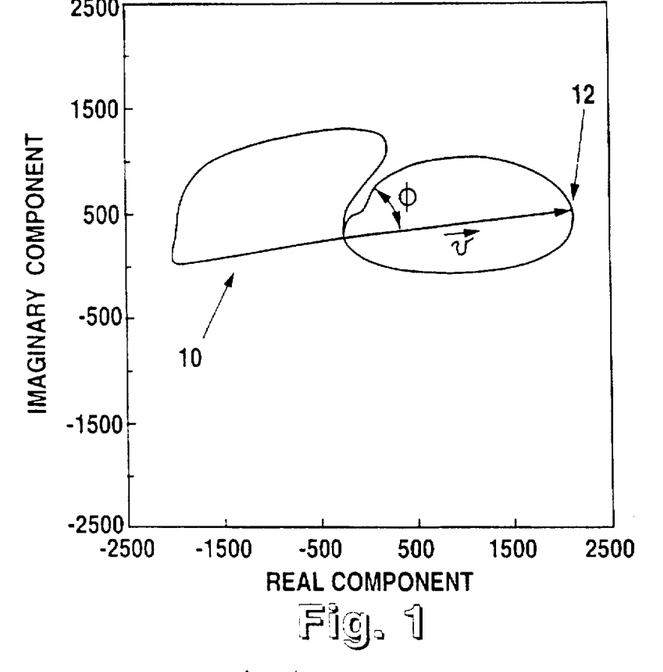
FIG. 1 shows a typical impedance plane display incorporating real component values on the x-axis and imaginary component values on the y-axis in a manner typical of-the prior art.

FIG. 1 of the present application shows a display typical in the prior art as might be displayed with an oscilloscope trace. In the complex plane analysis method used with eddy current data, the defect signal can be represented by a point corresponding to the end point of a vector that indicates changes in the measurement. The changes in the graphical position of this point when an anomaly is present in the material takes place in the indicated figure-eight shape. In the typical situation, the anomaly modifies the impedance of the detector windings and effects two successive unbalances of the measuring bridge which results in the figure-eight shape generated. The phase of the figure-eight shape is the value that often determines the character of the defect or flaw and results in the identification of the anomaly. When the material under study is homogeneous and without flaws or anomalies, the trace on the oscilloscope remains at the center of the screen.

In standard practice, therefore, a defect condition is shown by a vector with an origin at the center of the figure-eight in a direction towards the extreme of the peak to peak amplitude of the figure-eight trace. Once again, it is the phase of this vector that is relevant to the determination of the defect character. Standard methods of analysis have shown that the angle or phase of the figure-eight trace determine the nature of the flaw and that the peak-to-peak amplitude is characteristic of the flaws' extent. The problem with the Audenard patent and others that utilize this standard method of eddy current analysis is that the rapid interpretation of both of these values is extremely difficult from the oscilloscope-type figure-eight configuration, because only one spatial dimension is available for display when two dimensions are used for the signal.

U.S. Pat. No. 4,821,204, issued to Huschelrath on Apr. 11, 1989, entitled "Method and Device for Testing for Flaws with the Eddy Current Principle" describes yet another system for utilizing the basic complex plane analysis of eddy current test instrument operation. This apparatus involves a digital analysis as opposed to analog analysis, but still incorporates the same basic data and presents such data that, though it identifies threshold values appropriate for an automatic rejection system, fails to convey significant information about the detected flaws to a test operator.

U.S. Pat. No. 4,631,533, issued to Mark, Jr. on Dec. 23, 1986, entitled "Display of Eddy Current Detector Data" presents each of the various signal components (phase and quadrature) in a stripchart-like configuration or selectively by a set of Lissajous figures, each associated with a selected stripchart region. Here again, the Mark patent does not disclose a means for very quickly discerning a large amount of information about a particular flaw without the need for the test operator to carry out some level of time-consuming graphical analysis.

As described above, standard methods for displaying eddy current signals typically involve the use of an oscilloscope or computer-generated oscilloscope display for displaying an eddy current signature as the probe moves across the surface of the material under inspection. When a flaw or anomaly in the material is encountered by the probe, a specific signature signal is displayed on the oscilloscope, the characteristics of which are related to the characteristics of the material at that location.

In the prior art, the typical display pattern represented on oscilloscopes is the "figure-eight" shaped signal generated and shown as an example in FIG. 1. Characteristics associated with the phase of the extreme of the trace and the distance between the extreme (the amplitude) in the trace allow some understanding of the characteristics (type and magnitude) of the flaw associated with the signal. Unfortunately, the rapid interpretation of these graphic characteristics and the association of specific quantitative and qualitative values with specific flaw characteristics requires a significant level of experience and a prior association of display patterns and electrical properties of the material under inspection with previously identified anomalies in the material. Many of the above-described systems that are directed to "automatic" detection rely upon stored patterns or numerical ranges to identify and characterize anomalies.

The two-dimensional display shown in FIG. 1 is produced in the case of eddy current testing, by acquiring data from a single scan of an individual eddy current testing probe travelling over a surface under inspection. The two-dimensional display shown in FIG. 1 is a parametric plot of one of the data components, such as the imaginary or vertical component, as a function of the other component, such as the real or horizontal component.

Typically, an eddy current test probe generates an alternating magnetic field that induces eddy currents in the surface of the test specimen. A secondary magnetic field, established as a result of the eddy currents, is sensed by a separate sensing coil. The measured values of the secondary field are split into real and imaginary components. (The measured values are represented as digital complex numbers on a complex plane and are represented as real and imaginary components for ease of analysis.) Eddy current test instruments of the type capable of outputting these two components of the measured values are well known. Typically in the prior art, these component values are provided to the X and Y inputs of an oscilloscope and figures such as that shown in FIG. 1 are generated.

Some efforts in the past, such as those described above, have attempted to create three-dimensional images for such eddy current scan data but have failed to isolate and display simultaneously the real and imaginary components of the signal generated. In most cases, the displayed eddy current data is the sum of two mutually perpendicular drive signals representative of the eddy current signature at a particular location and one of the two movement signals associated with the position of the sensor. This composite signal is used as a y-component (typically) in conjunction with the other of the two movement signals in a manner that permits the display, and eventually the generation, of a three-dimensional image somewhat representative of the characteristic of a defect in the part under inspection. By combining and summing the eddy current signal data, the methods and systems in the prior art lose much valuable interpretive information about the characteristics of the flaw or anomaly. It would be desirable to obtain a three-dimensional image, easily interpretable by the test operator, that retains all of the information conveyed by the signal, both in its imaginary and real components.

SUMMARY OF THE INVENTION

It is therefore an object of the present invention to provide a method for generating and displaying four-dimensional complex data (e.g., from two spatial coordinates and the two components of the complex data) that allows the presentation of a large amount of data in a single visual image whose salient features can be quickly analyzed by an observer.

It is another object of the present invention to provide a method for generating and displaying three-dimensional complex data and to provide such data in a form that allows an analyst to distinguish between signals generated by different causes in a material under inspection, causes for example, such as cracks, fractures, geometry variations and the like.

It is another object of the present invention to provide a method for analyzing complex (real and imaginary component) data generated by any of a variety of non-destructive evaluation techniques and engineering analysis methods.

It is another object of the present invention to provide a method for the generation and display of three-dimensional complex data derived from the combination of positional data and the standard real and imaginary signal outputs generated by available eddy current testing probes and equipment.

In fulfillment of these and other objectives, the present invention provides a method, utilizing high speed digital computers and high resolution display systems, for "stacking" a plurality of two-dimensional plane displays acquired from individual scans over a surface being inspected. The solid three-dimensional image constructed in three-dimensional space incorporates the two dimensions typically provided by eddy current testing components, i.e. the imaginary or vertical component, and the real or horizontal component, and a third dimension that represents the physical orthogonal distance between sequential scans. The solid three-dimensional image is generated by connecting corresponding positional points on adjacent plane displays. The method thus generates a closed solid figure as long as the data returns to a null or equilibrium point away from the specific signal features that are being imaged. The three-dimensional image constructed thus consists of quadrilateral surfaces that are specified by their vertices. The visual presentation of the solid involves shading each surface thus generated by various means, as for example, shading levels that are representative of the magnitude of the signal.

The method of the present invention thus provides a representation of all of the data generated by the NDE probe in a form that allows visualization, not of the physical appearance of the anomaly detected, but of relevant characteristics of the anomaly that would normally require more detailed and time-consuming analysis to derive.

BRIEF DESCRIPTION OF THE DRAWING

FIG. 3b shows an example of a three-dimensional visualization of a partial data set containing a single flaw indication such as might be acquired from the sequence of scans shown in FIG. 3a.

The examples set out hereinbelow illustrate a preferred embodiment of the invention in one form thereof but such examples are not to be construed as limiting either the scope of the invention or its potential applications in any manner.

DETAILED DESCRIPTION OF A ILLUSTRATIVE PREFERRED EMBODIMENT

As indicated above, the prior art associated with the generation and display of data derived from the NDE testing of materials, especially as such testing relates to eddy current technologies, often involves the visual interpretation of measurement values associated with field fluctuations detected by sensors adjacent to the surface of the material. In eddy current testing, these values typically involve real and imaginary components of complex values associated with the induced and sensed fields. The display mechanisms heretofore utilized typically involved plotting these real and imaginary values on a complex cartesian coordinate system, wherein a signature signal, such as that shown in FIG. 1 may be generated on an oscilloscope. The typical eddy current signature signal is a "figure eight" shaped image, wherein the phase of the extreme (the end points on the figure eight plot) and the distance between the extreme are important to a characterization of the anomaly or defect.

Figure 2:
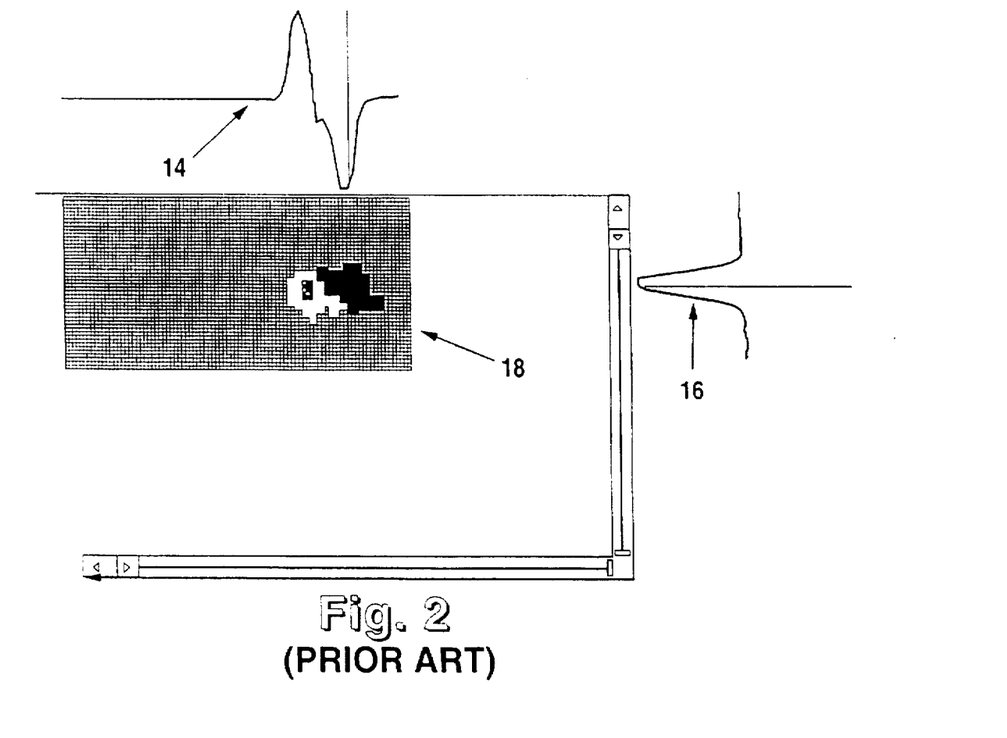
FIG. 2 shows a two-dimensional display resulting from a surface examination consisting of a series of scan lines in one direction and a pseudocolor (gray scale) image representation of the amplitude of one signal component (real or imaginary) at a time in a manner typical of the prior art.

Obviously, an interpretation of the data represented on such an oscilloscope trace involves prior knowledge not only of what the various characteristics of the trace represent, but also knowledge of the position of the sensor at the particular time of the signal reception. The prior art visual representation shown in FIG. 2 permits a somewhat more sophisticated approach for interpreting the data by providing more of the information in a single visual format. FIG. 2, represents data obtained by scanning with an eddy current probe a number of times across a 1.5 mm long fatigue crack. The data shown and represented in FIG. 1 is derived from a single scan in this examination of a 1.5 mm fatigue crack. The view in FIG. 2 represents, however, only one of the two complex components of the signal data graphed in association with the position data related to the scan. Thus, while FIG. 2 provides more information in a single visualization form than FIG. 1 might, it sacrifices some of the information returned by the eddy current probe in order to represent the information. Although some characteristics of the anomaly might be determined from FIG. 2, some information is lost and thus, the method is limited in what it can quickly tell the test observer about the anomaly. In many cases, it is not only the value of one or the other of the signal components that is relevant, but also the relation between the two signal components that is descriptive of the anomaly. Insofar as one of the objects of the present invention is to distinguish between signals generated by different anomalies or causes within the material under inspection, the more information conveyed in a single visual form, the more accurate the distinctions that the observer can make.

Figure 3A:
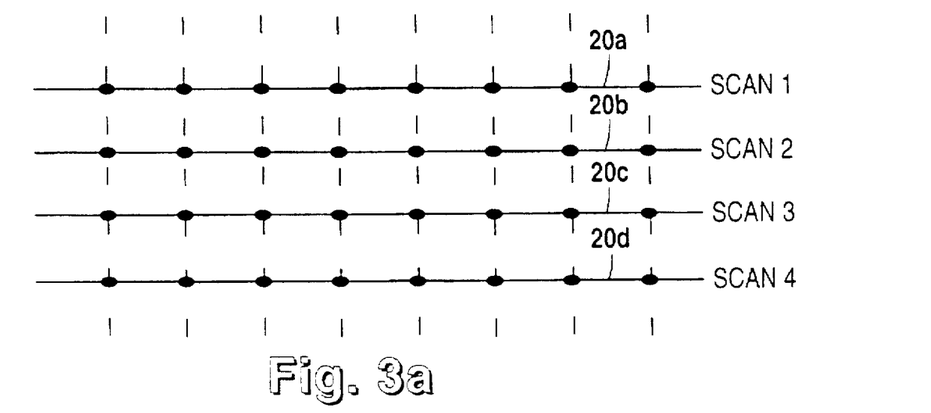
FIG. 3a is a schematic representation of a sequence of scans appropriate for collecting data usable with the method of the present invention.

As described above, the information gathered from an eddy current probe, for example, comprises and is generally displayed as values for phase and extrema in the figure-eight plot typically presented on an oscilloscope. In FIG. 1, plot (10) with extrema (12) discloses phase data and an extreme vector V with an identifiable magnitude. The interpretation of this figure involves learned associations between the phase and extreme values and characteristic traces for known defects and anomalies. In addition, a knowledge of the type of material and the relationship between specific phase values and extreme values is important. In FIG. 2, positional plots (14) and (16) show variations in signal components that are combined in graphic image (18). As indicated above, gray scale imaging provides one of the components of such an examination consisting of multiple scans. FIG. 3a discloses the progress of multiple scans of the type suitable for the creation of data such as that shown in FIG. 2.

Figure 4:
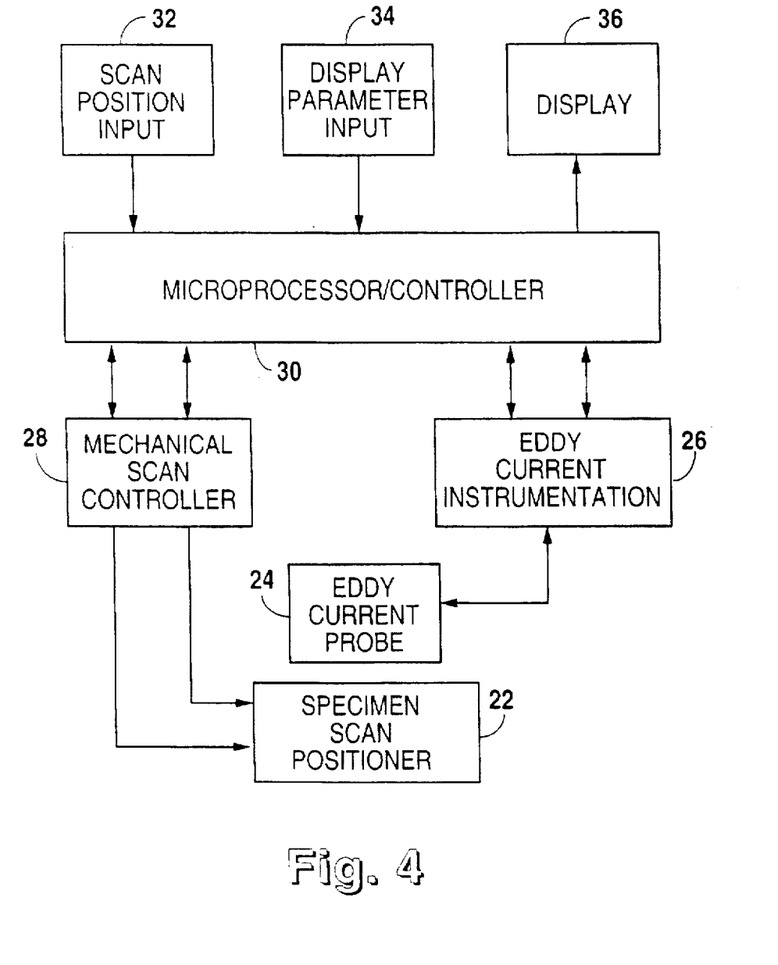
FIG. 4 is a schematic block diagram of a system appropriate for implementing the method of the present invention.

FIG. 4 discloses in simplified, schematic form, a system of components typical of eddy current analysis and suitable for implementation of the method of the present invention. Specimen scan positioner (22) is connected to mechanical scan controller (28), which in turn is connected to microprocessor/controller (30). These elements carry out the physical positioning of the scan and return position parameters for analysis. Eddy current probe (24) is shown as it would positioned adjacent to specimen scan positioner (22) and connected to eddy current instrumentation (26). Microprocessor/controller (30) controls the operation of eddy current instrumentation (26) and of course receives back the signal information used in the analysis.

Microprocessor controller (30) receives input from the test operator by way of scan position input (32) and display parameter input (34). Scan position input (32) permits the test operator to manually control the scan or to select an automatic scan plan, depending upon the particular specimen under study. Display parameter input (34) permits the test operator to select the characteristics of the display most suitable for the types of anomalies under investigation and to rotate the displayed images. Display (36) presents the three-dimensional image to the test operator in a form that permits ready identification of the characteristics of the detected anomaly.

Figure 3B:
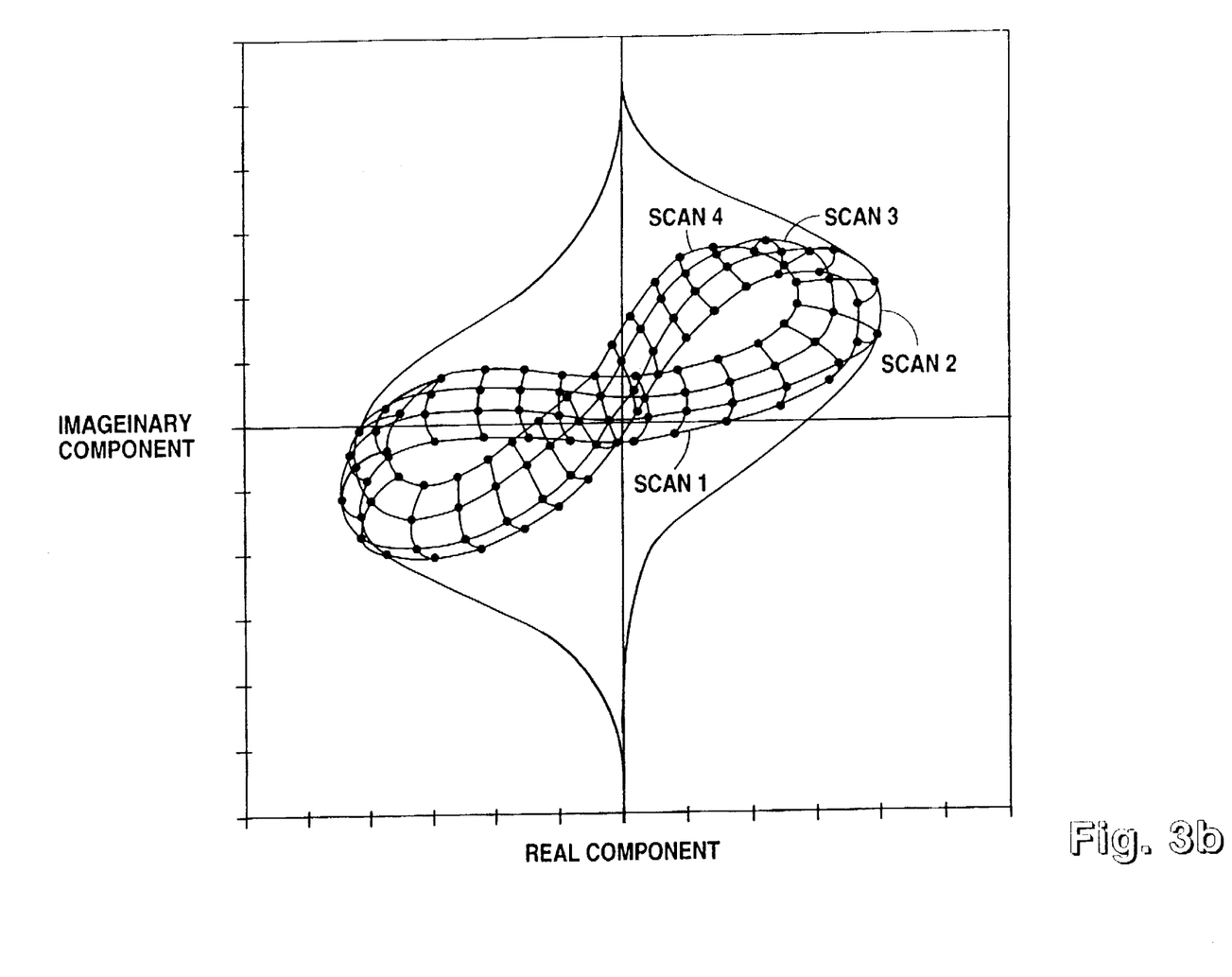

FIG. 3b demonstrates how the three-dimensional display of the present method can be considered as a stacking of two-dimensional plane displays with corresponding points between such planes connected. As described above, each two-dimensional display is a parametric plot of one of the components of the data (the imaginary component for example) as a function of the other component (the real component for example). Once again, the implicit variable not plotted in such a two-dimensional plane is a variable that controls acquisition of the data, typically position or time. In the typical two-dimensional plane display shown in FIG. 1, a scan of the surface of a material under inspection is made, by varying the position of the sensor across the material which causes the components of the signal to vary with respect to each other. A solid three-dimensional image is generated by combining a gradually displaced series of such position varying scans.

In the simplest case, a number of linear scans, all of which are parallel and of the same length, can be implemented as shown in FIG. 3a. In each of the scans represented in FIG. 3a, data is acquired at a number of points along the scan, each one of which is at the same distance (or time) into the respective scan. As mentioned above, FIG. 2 represents a gray scale image plot of one component (the real or the imaginary) of such an examination consisting of a multiple number of scans.

In the preferred embodiment of the present invention a solid three-dimensional image (as in FIG. 3b) is constructed in three-dimensional space where one of the dimensions is associated with the real component of the data value and a second is associated with the imaginary component. The third dimension is represented and is associated with the physical distance value orthogonal to the parallel scan as is shown in FIG. 3a. Again, the three-dimensional image is seen as the construction of a stack of two-dimensional images, each displaced from the adjacent image by a value representative of the physical distance between the adjacent scans.

The solid image is formed by the computer by connecting corresponding points on adjacent two-dimensional plane displays. For example, the third point (in time or distance) of one scan is connected to the third point of the immediately preceding and the immediately following scans. This connection may be made with straight lines or by using well known mathematical techniques to generate higher order curve fits. A closed solid figure is generated as long as the eddy current data returns to a null or equilibrium point in the area away from the signal features associated with the anomaly or flaw. The constructed image consists of quadrilateral surfaces that are specified by their vertices.

Figure 5A:
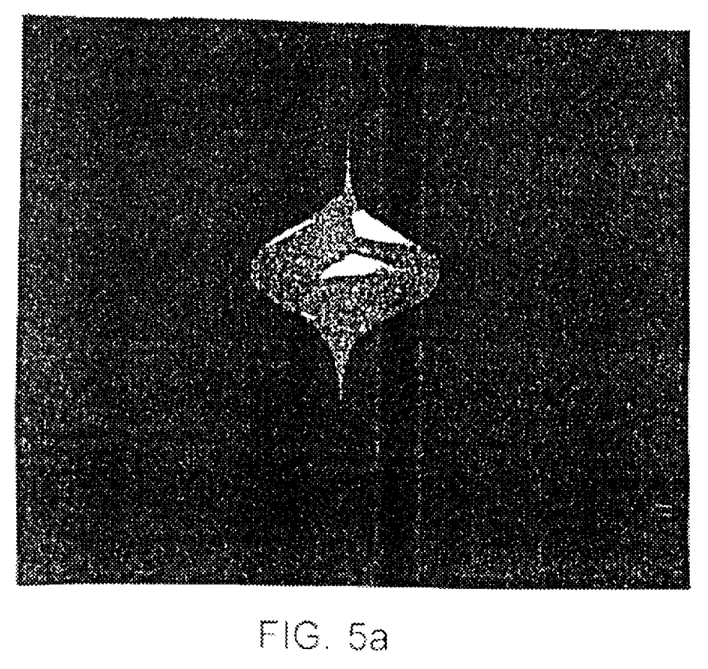
FIG. 5a is an example of a three-dimensional visualization of an entire data set containing a single flaw indication.
Figure 5B:
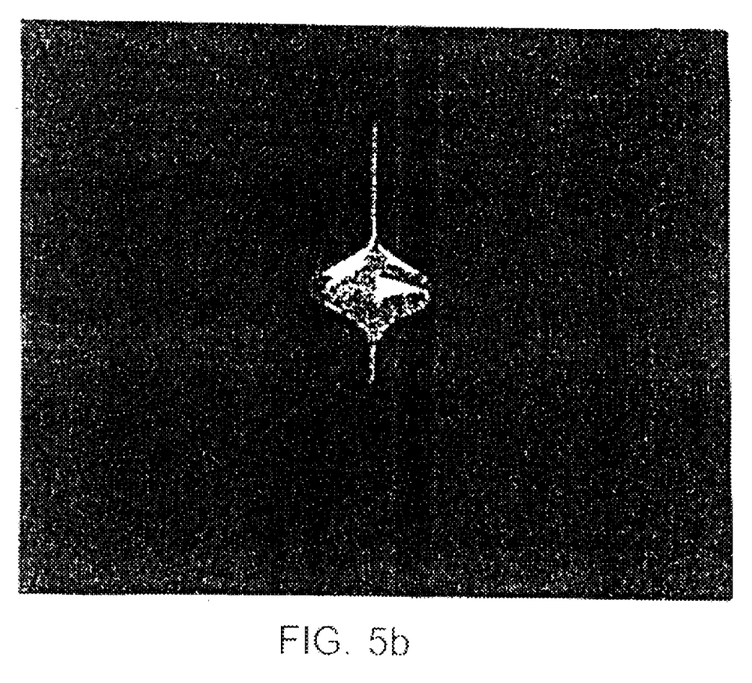
FIG. 5b is the three-dimensional visualization shown in FIG. 5a rotated at a different angle.

The images shown in FIGS. 5a and 5b are representative of such constructions. The data for these figures was obtained by scanning the eddy current probe multiple times across the same 1.5 mm-long a fatigue crack as was used for the data shown in FIG. 1 and FIG. 2. Unlike the prior art figures, however, both components and their relationship can be viewed in the single visualization form shown in FIGS. 5a and 5b. In the two views shown, the same set of data is presented rotated in order to provide the analyst with a complete view. In a practical application, the test operator would utilize display parameter input controls to interactively rotate the image to any desired angle to highlight particular features recognizable in conjunction with particular defect characteristics.

In order to visually represent the solid, each of these quadrilateral surfaces is shaded by one of a variety of means. One example is to use a color shading scheme to represent the magnitude of the signal where the magnitude is the square root of the sum of the squares of the two complex components at each position or a suitably obtained average of the data obtained from the vertices. If a finer image is desired, various interpolation methods could be used to smooth the surface.

Analysis of the information presented in the three-dimensional visualization form involves recognizing changes in the features of the two-dimensional plane as a function of position along one physical coordinate. For example, a change in the phase and amplitude response of a flaw in the direction parallel to the flaw orientation and perpendicular to specific scan directions is partially revealed in the "three-dimensional" volume images of the type shown in FIG. 2. Observations have shown that certain signal generators such as cracks, when examined by certain eddy current probes, such as differential probes, create characteristic patterns of phase and amplitude. In particular, and also as illustrated in FIG. 2, the peak phase response of the flaw occurs at locations (specific scans) away from those crossing over the center of the flaw, even though the peak amplitude response occurs for scans approximately over the center of the flaw.

These various characteristic patterns can be quickly viewed when presented as three-dimensional volume images, such as those in FIGS. 5a and 5b, and the resulting images can be distinguished from other images created by non-relevant indications such as geometry or weld material variations. These distinctions can be shown even though such non-relevant indications may generate individual two-dimensional plane images (figure eight type images) that are similar in features to those from the flaws of concern.

While the method of the present invention and the system appropriate for its implementation have been described in conjunction with a preferred embodiment, it is anticipated that one skilled in the art will identify further applications of the present invention in a manner consistent with the procedures associated with its implementation. For example, other types of NDE systems produce signal values similar to those generated by eddy current testing systems. It is anticipated that, with minor modifications, the methods of the present invention could be applied on such other similar test environments. It is understood that these other applications of the present invention will be apparent to those skilled in the art upon a reading of the above description of the preferred embodiments and a consideration of the appended claims and drawings.

We claim:

1. A method for generating and displaying complex data derived from non-destructive evaluation of material comprising the steps of:

operating a probe near the surface of said material under investigation so as to detect anomalies, said anomalies characteristically causing variations in probe response;

generating a primary electrical signal whose characteristics are indicative of the characteristics of said anomalies;

converting said primary electrical signal into first and second component signals representing the complex components of said primary electrical signal;

generating a position signal representative of a position of said probe relative to said material under investigation;

moving said probe to a new position near the surface of said material so as to effect a first scan of said material for said anomalies;

storing said component signals and said position signal for said first scan of said material;

effecting a second scan of said material; said second scan differing from said first scan by a known positional displacement;

storing said component signals and said position signal for said second scan of said material;

effecting a plurality of additional scans of said material, each of said additional scans differing from a previous scan by a known positional displacement;

storing said component signals and said position signal for each of said additional scans;

matching portions of said component signals for each of said scans, said matched portions positionally aligned on said material;

generating a mathematical surface defined by said matched component signals for all of said scans, a first axis of said mathematical surface corresponding to said first component signal, a second axis of said mathematical surface corresponding to said second component signal, and a third axis of said mathematical surface corresponding to said position signal; and displaying said mathematical surface.

2. The method of claim 1 further comprising the step of shading areas of said three-dimensional surface, said shading for facilitating an interpretation of said three-dimension surface upon display of said surface.

3. The method of claim 1 wherein said probe comprises an impedance probe such that said anomalies in said material cause characteristic variations in an impedance in said probe.

4. The method of claim 1 wherein said probe comprises an ultrasonic probe such that said anomalies in said material cause characteristic variations in a mechanical wave returned to said probe from said anomalies.

5. The method of claim 1 wherein said steps of generating and displaying said three-dimensional surface comprise use of a computer microprocessor and a video display terminal.

6. A method for displaying complex data derived from non-destructive evaluation of material comprising the steps of:

providing electrical signal data for a plurality of interrogational scans of said material, said signal data having characteristics indicative of the internal characteristics of said material;

providing locational data associating said electrical signal data with locations in said material;

converting said electrical signal data into two sets of signal data representing the paired complex components of said electrical signal data;

matching portions of said two sets of signal data for each of said scans, said matched portions positionally aligned on said material;

generating a mathematical surface defined by said matched sets of signal data for said plurality of scans and said locational data; and displaying said mathematical surface.

* * * * *

UNITED STATES PATENT AND TRADEMARK OFFICE
CERTIFICATE OF CORRECTION

PATENT NO. : 5,895,439

DATED : April 20, 1999

INVENTOR(S) : Jay L. Fisher and Keith S. Pickens

It is certified that error appears in the above-identified patent and that said Letters Patent is hereby corrected as shown below:

On the title page,

Item [56], 2nd cited reference

The inventor should read: Weidman

Item [56], 12th cited reference

The Patent No. should read: 5,067,167

In the Drawings:

Fig. 3b (sheet 3 of 4)

The left vertical axis name should read: IMAGINARY COMPONENT

UNITED STATES PATENT AND TRADEMARK OFFICE
CERTIFICATE OF CORRECTION

PATENT NO. : 5,895,439
DATED : April 20, 1999
INVENTOR(S) : Jay L. Fisher and Keith S. Pickens It is certified that error appears in the above-identified patent and that said Letters Patent is hereby corrected as shown below:

In the specification:

Column 5, Line 28, "of-the" should read --of-the--
should read: of the

Column 6, Line 66, "Microprocessor controller" should read --Microprocessor/controller--

Signed and Sealed this

Third Day of August, 1999

Attest:

Q. TODD DICKINSON

*Attesting Officer*  *Acting Commissioner of Patents and Trademarks*